United States Patent [19]

An

[11] Patent Number: 5,486,229
[45] Date of Patent: Jan. 23, 1996

[54] RAW MATERIAL FOR PRODUCING FERRITE DUST FOR FRICTION ELEMENTS AND METHOD OF REDUCING THE SAME

[75] Inventor: Ki Ju An, Sunchun, Rep. of Korea

[73] Assignee: Kumsan Material Co., Ltd., Chonlla Nam-Do, Rep. of Korea

[21] Appl. No.: 99,222

[22] Filed: Jul. 29, 1993

[30] Foreign Application Priority Data

Jul. 29, 1992 [KR] Rep. of Korea ............ 92-13577
Jul. 30, 1992 [KR] Rep. of Korea ............ 92-13678

[51] Int. Cl.$^6$ .................... C09K 3/14; C22B 5/18
[52] U.S. Cl. .................... 106/36; 75/503; 75/504; 75/505; 75/235; 75/234
[58] Field of Search .................... 106/36; 51/308, 51/309; 523/153; 188/251 A; 75/503, 504, 505, 235, 234

[56] References Cited

U.S. PATENT DOCUMENTS

| | | | |
|---|---|---|---|
| 3,015,553 | 1/1962 | Johnson | 75/503 |
| 3,067,493 | 12/1962 | Sampson | 106/36 |
| 3,101,527 | 8/1963 | Weinman et al. | 106/36 |
| 3,191,278 | 6/1965 | Kendall et al. | 106/36 |
| 3,361,557 | 1/1968 | Babcock et al. | 75/504 |
| 3,434,998 | 3/1969 | Aldrich et al. | 106/36 |
| 3,437,458 | 4/1969 | Volker et al. | 106/36 |
| 3,494,774 | 2/1970 | Bray | 106/36 |
| 3,663,497 | 5/1972 | Ninomiya et al. | 106/36 |
| 3,751,241 | 8/1973 | Sloughfy et al. | 75/3 |
| 4,051,097 | 9/1977 | Aldrich | 106/36 |
| 4,182,437 | 1/1980 | Roberts et al. | 106/36 |
| 4,280,935 | 7/1981 | Ogiwara | 106/36 |
| 4,438,004 | 3/1984 | Myers | 106/36 |
| 5,196,620 | 3/1993 | Gustin et al. | 588/257 |

*Primary Examiner*—C. Melissa Bonner
*Attorney, Agent, or Firm*—Felfe & Lynch

[57] ABSTRACT

A raw material for producing ferrite dust for friction elements and a method of producing reduced ferrite dust, capable of using, as the raw material, various collected sludge and dust which are by-products obtained at iron factories. The sludge has solid components consisting essentially of 35 to 50% total Fe, no more than 2% metallic Fe, 1.0 to 8.0% $SiO_2$, 0.3 to 2.5% MgO, 1.0 to 6.0% CaO, 1.0 to 5.0% $Al_2O_3$, 20 to 40% fixed carbon, and 0.1 to 1.0% ZnO, said sludge having a grain size of 20 to 250 mesh, an apparent specific gravity of 1.2 to 2.0 g/cc, a real specific gravity of 3.3 to 4.3 g/cc, and a porosity of 40 to 65%. The collected dust consists essentially of 50 to 85% true Fe, 20 to 55% FeO, 30 to 55% $Fe_3O_4$, 2 to 12% CaO, 1 to 5% $SiO_2$, 1 to 3% MgO, 1 to 3% MnO, and no more than 1% fixed carbon, 50 to 85% total Fe, 2 to 12% CaO, 1 to 5% $SiO_2$, 1 to 3% MgO, 1–3% MnO, and no more than 1% fixed carbon. The sludge is treated under reduction conditions of a reduction gas charge rate of 8 to 20 Nl/min., a reduction temperature of 1,000° to 1,200° C., a reduction time of 20 to 60 minutes and a reduction gas-to-solid material ratio of 0.5 to 2.5 and then annealed at an annealing temperature of 650° to 800° C.

4 Claims, 1 Drawing Sheet

RAW MATERIAL FOR PRODUCING FERRITE DUST FOR FRICTION ELEMENTS AND METHOD OF REDUCING THE SAME

BACKGROUND OF THE INVENTION

1. Field of the Invention

The present invention relates to non-toxic ferrite dust for friction elements employed in brake systems of machinery such as vehicles, farming machines, heavy machines and trains, and more particularly to a raw material for producing such ferrite dust and a method of reducing the same.

2. Description of the Prior Art

Conventional friction elements employed in brake systems of various machinery such as vehicles, farming machines, heavy machines and trains have been made of acicular asbestos consisting predominately of $SiO_2$. Since this material did severe harm to the human body, it has been highlighted as a severe problem of causing environmental pollution.

In advanced nations, reduced ferrite dust has already been used as the substitution for acicular asbestos, in order to not only improve the performance of friction elements, but also solve the problem of environmental pollution.

Friction elements should have superior friction characteristic and heat resistance, for a performance of products of brake systems.. Also, they should have a long use life and cause no wear damage at friction surfaces and no environmental pollution.

Accordingly, desirable conditions of Ferrite dust satisfying the above-mentioned requirements are a lower apparent specific gravity and a higher porosity. In particular, when the shape of grains is angular and the distribution of pores is irregular, there is an improvement in charge rate, upon a compact molding. In this case, the specific surface areas of grains are also increased, thereby enabling an increase in frictional coefficient and no occurrence of wear damage. Where ferrite dust is used alone for producing a friction element, however, a superior performance for the friction element can not be obtained. In this regard, ferrite dust has been conventionally added with nonmetallic oxides such as $SiO_2$, CaO, $Al_2O_3$, MgO, ZnO, $P_2O_5$, MnO and etc., in proper amounts, so as to improve frictional characteristic, heat resistance and use life and avoid wear damage at friction surfaces.

One of known methods relating to reduced ferrite dust for friction elements is to reduce coarse mill scale with high FeO content, together with solid coke, pulverize the reduced mixture, and then subject it to a secondary reduction treatment, an annealing and a decarburization, so as to produce reduced ferrite dust.

However, such a method in which mill scale is used as a raw material for ferrite dust has disadvantages of a low productivity, in that it requires a repetition of crushing and pulverizing and a long treatment time for the reduction, the decarburization and the annealing. In particular, the mill scale is expensive, because it is used as a dephosphorization agent for molten iron.

Another method has been also proposed, which uses iron ore of high purity containing at least 95% magnetite ($Fe_3O_4$) with a total Fe content of at least 70%. This method can reduce the treatment time, as compared with the method of reducing mill scale, in that the iron ore is reduced.

Ferrite dust by primarily reducing the iron ore together with solid coke. However, it encounters disadvantages in terms of supplying of raw materials and economy, because of difficulty in stably supplying high purity iron ore and instability in iron ore cost.

Referring to above description which has been made in conjunction with conventional method of producing reduced ferrite dust, it can be found that a raw material for producing friction elements is the criterion of evaluating workability, productivity, economy and environmental pollution caused by dust and that characteristic of raw material determines a reduction treatment method to be utilized.

SUMMARY OF THE INVENTION

Therefore, an object of the invention is to provide a raw material for producing ferrite dust for friction elements and a method of producing reduced ferrite dust, capable of using, as the raw material, various collected sludge and dust which are by-products obtained at iron factories, thereby improving productivity, economy and workability, enhancing added value and avoiding environmental pollution.

BRIEF DESCRIPTION OF THE DRAWING

Other objects and aspects of the invention will become apparent from the following description of embodiments with reference to the accompanying drawing in which.

DETAILED DESCRIPTION OF THE PREFERRED EMBODIMENTS

Figure 1:
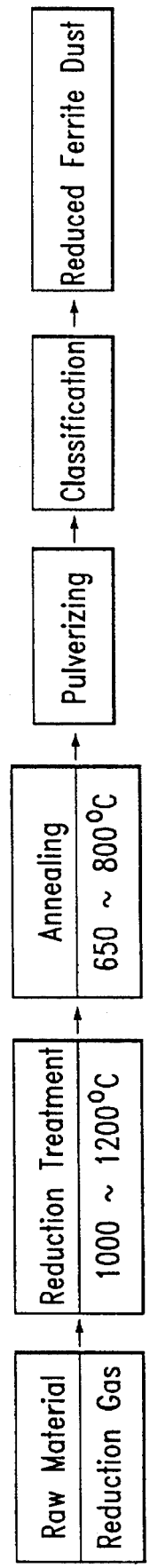
FIG. 1 is a view illustrating a process for producing ferrite dust according to the present invention.

Reduced ferrite dust according to the present invention is produced, using one of two methods in which collected sludge and dust are used as raw materials, respectively.

In accordance with one embodiment of the present invention, the collected sludge which is a by-product obtained at iron factories has a chemical composition and physical characteristics indicated in Table 1. As shown in Table 1, the collected sludge consists of 35 to 50% total Fe including Fe in iron oxides, no more than 2% metallic Fe, 1.0 to 8.0% $SiO_2$, 0.3 to 2.5% MgO, 1.0 to 6.0% CaO, 1.0 to 5.0% $Al_2O_3$, 20 to 40% fixed carbon, and 0.1 to 1.0% ZnO. All percentages are based on percentages by weight. The sludge has the grain size of 20 to 250 mesh, the apparent specific gravity (ASG) of 1.2 to 2.0 g/cc, the real specific gravity (RSG) of 3.3 to 4.3 g/cc, and the porosity of 40 to 65% measured by a mercury porosimeter.

TABLE 1

(Chemical Composition and Physical Characteristics of Collected Sludge)

| Chemical Composition (% by weight) | | | | | | | |
|---|---|---|---|---|---|---|---|
| T.Fe | M.Fe | $SiO_2$ | MgO | CaO | $Al_2O_3$ | C | ZnO |
| 35–50 | ≦2 | 1.0–8.0 | 0.3–2.5 | 1.0–6.0 | 1.0–5.0 | 20–40 | 0.1–1.0 |

| Physical Characteristics | | | | |
|---|---|---|---|---|
| ASG(g/cc) | RSG(g/cc) | Porosity | Grain Size | Grain Size Distribution |
| 1.2–2.0 | 3.3–4.3 | 40–65% | 20–250 | 80–95 |

As apparent from Table 1, the sludge contains ingredients essentially required in a raw material for producing friction elements, in proper amounts. In particular, the ingredients are present in a mixed state, so that, where they are subjected to a reduction treatment, reduced ferrite dust can be simply produced in a short time, by virtue of a simultaneous reduction reaction of fixed carbon.

The obtained reduced ferrite dust is then mixed with pearlite powder, rubber powder, paper powder, brass chip, car shoe dust, barium sulfate, phosphorous graphite. At this time, phenol resin is added as a binder. The resultant mixture is compacted while being heated at a temperature of 180° to 250° C. After a subsequent heat treatment, it is possible to obtain a superior friction element capable of resisting a high temperature using condition of a friction coefficient of 0.15 to 0.40 and a heat resistance temperature of 350° to 950° C.

In accordance with the other embodiment of the present invention, the collected dust which is a by-product obtained at iron factories has a chemical composition and physical characteristics indicated in Table 2. As shown in Table 2, the collected dust consists of 50 to 85% total Fe, 20 to 55% FeO, 30 to 55% $Fe_3O_4$, 2 to 12% CaO, 1 to 5% $SiO_2$, 1 to 3% MgO, 1 to 3% MnO, and no more than 1% fixed carbon, all percentages being based on percentages by weight. The dust has the grain size of 40 to 250 mesh, the apparent specific gravity of 1.5 to 2.2 g/cc, the real specific gravity of 4.0 to 5.0 g/cc, and the porosity of 45 to 65% measured by the mercury porosimeter.

TABLE 2

(Chemical Composition and Physical Characteristics of Collected Dust)

Chemical Composition (% by weight)

| T.Fe | CaO | $SiO_2$ | MgO | MnO | C | $P_2O_5$ | S | ZnO |
|---|---|---|---|---|---|---|---|---|
| 50–85 | 2–12 | 1–5 | 1–3 | 1–3 | ≦1 | ≦1 | ≦0.5 | ≦1 |

Physical Characteristics

| ASG(g/cc) | RSG(g/cc) | Porosity | Grain Size | Grain Size Distribution |
|---|---|---|---|---|
| 1.5–2.2 | 4.0–5.0 | 45–65% | 40–250 | 70–90 |

The collected dust with the above chemical composition and physical characteristics is reduced by a reduction gas in a reduction furnace and then slowly cooled. Then, the reduced dust is subjected to a pulverizing process, so as to produce reduced ferrite dust. In similar manner to the reduced ferrite dust made from the collected sludge, the obtained reduced ferrite dust is added with necessary ingredients and then molded at a low temperature of 180° to 250° C. By subsequently heat treating the resultant product, it is possible to obtain a superior friction element capable of resisting the high temperature using condition of a friction coefficient of 0.15 to 0.40 and a heat resistance temperature of 350° to 950° C.

The present invention will be understood more readily with reference to the following examples for producing reduced ferrite dust materials from the above-mentioned two kinds of raw materials. However, these example are intended to illustrate the invention and are not to be construed to limit the scope of the present invention.

EXAMPLES

For producing a ferrite dust material for friction elements, a raw material such as collected sludge or dust was subjected to a reduction treatment process illustrated in FIG. 1. The reaction conditions used in the reduction treatment is shown in Table 3.

TABLE 3

| | Example | | |
|---|---|---|---|
| | A | B | C |
| Charged Reduction Gas Amount (Nl/min.) | 8 | 20 | 40 |
| Reduction Temperature (°C.) | 1,200 | 1,100 | 1,000 |
| Reduction Time (min.) | 60 | 20 | 40 |
| Reduction Gas-to-Solid Material Ratio* | 0.5 | 1.5 | 2.5 |
| Annealing Temperature (°C.) | 650 | 720 | 800 |

*Reduction Gas-to-Solid Material Ratio = $\frac{\text{Gas Amount (Nl)}}{\text{Raw Material Amount (Kg)}}$ As shown in Table 3, the examples employed the reduction gas charge rate of 8 to 40 Nl/min., where Nl is normal liters. For the reduction, the treatment temperature was 1,000° to 1,200° C. and the treatment time was 20 to 60 minutes. The ratio of reduction gas amount per 1 Kg of collected sludge or dust was 0.5 to 2.5. The reduced ferrite dust obtained after the reduction treatment exhibited a sintered phase at grain surfaces thereof. An annealing treatment is required for softening grains hardened during the reduction treatment. In the examples, the annealing treatment was carried out at a temperature range of 650° to 800° C. for 20 minutes. In these conditions, the hardened grains were sufficiently softened.

It is preferred that the reduction gas is charged at a rate of 8 to 40 Nl/min., as shown in Table 3. At the rate of below 8 Nl/min., the reduced ferrite dust contains undesirably considerable amounts of $Fe_3O_4$ and FeO not reduced, even though other conditions may be improved. When the rate exceeds 40 Nl/min., the amount of reduction gas exceeds the reduction gas demand for the reduction. As a result, there is no economy.

The temperature for the reduction treatment is preferred to be 1,000° to 1,200° C. At the reduction temperature of below 1,000° C., the reduction time is undesirably lengthened, even though other conditions may be proper. Moreover, ferrous oxide not reduced is present in large amount. At the reduction temperature of above 1,200° C., the sintering effect is excessively exhibited, even though the reduction rate is high. By the excessive sintering effect, there are generated various disadvantages such as a decrease in porosity, an increase in specific gravity and a difficulty in performing a pulverizing process.

A proper time for the reduction treatment is 20 to 60 minutes. The reduction time of less than 20 minutes comes short of the minimum time required for the reduction, thereby causing ferrous oxide not reduced to be present in large amount. When the reduction treatment is carried out for more than 60 minutes, an overtime after the completion of reduction is present, so that a sintering proceeds partially, thereby degrading the quality of products for friction elements. Moreover, there is no economy.

The ratio of reduction gas required in reducing 1 Kg of collected sludge or dust is 0.5 to 2.5. When the ratio is less than 0.5, the reduced ferrite dust contains a large amount of ferrous oxide not reduced. At the ratio of more than 2.5, an excess of reduction gas is unnecessarily present, thereby increasing the consumed amount of reduction gas.

As mentioned above, the reduced sludge or dust is required to be maintained at 650° to 800° C. for 20 minutes during the slow cooling treatment therefor so that its hardened grains are softened. Under a condition beyond the temperature range and the maintenance time, the property of hardened grains still remains, resulting in a wear damage at friction surfaces of finally produced friction elements in use.

Referring to Tables 4 and 5, there is shown chemical compositions and physical characteristics of ferrite dust obtained after the reduction treatments for the collected sludge or dust under the conditions indicated in Table 3, according to the examples of the present invention. As apparent from Table 4 and 5, most of ferrous oxide was changed into metallic Fe. The structure of obtained metallic Fe had a number of pores, because of the presence of spaces which had been occupied by oxygen removed by reduction gas. The porosity was increased by 10%, as compared with the porosity before the reduction treatment. The porosity was measured by a mercury porosimeter.

TABLE 4

(Chemical Composition and Physical Characteristics after Reduction Treatment for Collected Sludge)

| Chemical Composition (% by weight) | | | | | | | | |
|---|---|---|---|---|---|---|---|---|
| T.Fe | M.Fe | FeO | $SiO_2$ | MgO | CaO | $Al_2O_3$ | C | ZnO |
| 70–85 | 68–83 | ≦2 | 1.0–8.0 | 0.3–2.5 | 1.0–6.0 | 1.0–5.0 | ≦1 | 0.1–1.0 |

| Physical Characteristics | | | | |
|---|---|---|---|---|
| ASG(g/cc) | RSG(g/cc) | Porosity | Grain Shape | Pore Distribution |
| 1.25–2.06 | 4.0–5.5 | 50–75% | angular | irregular |

TABLE 5

(Chemical Composition and Physical Characteristics after Reduction Treatment for Collected Dust)

| Chemical Composition (% by weight) | | | | | | | | | | |
|---|---|---|---|---|---|---|---|---|---|---|
| T.Fe | M.Fe | FeO | CaO | $SiO_2$ | MgO | MnO | C | $P_2O_5$ | S | ZnO |
| 55–92 | 53–90 | ≦2 | 2–12 | 1–5 | 1–3 | 1–3 | ≦0.5 | ≦1 | ≦0.5 | ≦0.7 |

| Physical Characteristics | | | | |
|---|---|---|---|---|
| ASG(g/cc) | RSG(g/cc) | Porosity | Grain Shape | Pore Distribution |
| 1.55–2.25 | 5.0–6.0 | 50–75% | angular | irregular |

As apparent from Tables 4 and 5, the porosity of dust obtained after the reduction treatment is 12 to 38% in both cases of collected sludge and collected dust, thereby providing superior characteristics of friction elements. Furthermore, the friction elements can maintain friction characteristic for a lengthened time, without an occurrence of wear at friction surfaces.

The nonmetallic oxides such as $SiO_2$, CaO, $Al_2O_3$, MgO, ZnO, $P_2O_5$, MnO and etc. contained in the reduced ferrite dust in a mixed state are those exhibiting the characteristics of the raw material for friction elements according to the present invention. Since the grain size of sludge or dust employed is 20 to 250 mesh, there is provided an advantage that the reduction rate is very high. Practically, it is possible to produce reduced ferrite dust under a more advantageous condition, in that fixed carbon is contained in the collected sludge in an amount of 20 to 40%.

As apparent from the above description, the present invention makes it possible to produce reduced ferrite dust by using collected sludge or dust which are by-products obtained at iron factories, as raw material. Accordingly, there are an enhancement in added value and the prevention of environment pollution, by virtue of the regeneration of waste. The product of the present invention is also superior to the conventional reduced products, in terms of productivity and economy. In use as friction elements, the product of the present invention also provides effects of a superior friction characteristic and a lengthened use life. Consequently, it is possible to produce friction elements with good quality.

What is claimed is:

1. A method of producing a reduced ferrite dust material which is used as a raw material for friction elements, comprising the steps of:

providing a sludge containing solids consisting essentially of 35 to 50% total Fe including Fe in iron oxides and no more than 2% metallic Fe, 1.0 to 8.0% $SiO_2$, 0.3 to 2.5% MgO, 1.0 to 6.0% CaO, 1.0 to 5.0% $Al_2O_3$, 20 to 40% fixed carbon, and 0.1 to 1.0% ZnO, all percentages being based on percentages by weight, said sludge having grain size of 20 to 250 mesh, apparent specific gravity of 1.2 to 2.0 g/cc, real specific gravity of 3.3 to 4.3 g/cc, and porosity of 40 to 65% measured by a mercury porosimeter;

treating the sludge under reduction conditions by exposing the sludge to a reduction gas at a charge rate of 8 to 20 Nl/min., a reduction temperature of 1,000° to 1,200° C., a reduction time to 20 to 60 minutes and a reduction gas-to-solid material ratio of 0.5 to 2.5; and annealing the reduced sludge at an annealing temperature of 650° to 800° C.

2. A method of producing a reduced ferrite dust material which is used as a raw material for friction elements, comprising the steps of:

providing a dust consisting essentially of 50 to 85% total Fe, 20 to 55% FeO, 30 to 55% $Fe_3O_4$, 2 to 12% CaO, 1 to 5% $SiO_2$, 1 to 3% MgO, 1 to 3% MnO, and no more than 1% fixed carbon, all percentages being based on percentages by weight, said dust having a grain size of 40 to 250 mesh, an apparent specific gravity of 1.5 to 2.2 g/cc, a real specific gravity of 4.0 to 5.0 g/cc, and a porosity of 45 to 65% measured by a mercury porosimeter;

treating the dust under reduction conditions by exposing the sludge to a reduction gas at a charge rate of 15 to 40 Nl/min., a reduction temperature of 1,000° to 1,200°

C., a reduction time of 20 to 60 minutes and a reduction gas-to-solid material ratio of 0.8 to 2.0; and annealing the reduced dust at an annealing temperature of 650° to 800° C.

3. A reduced ferrite dust material for friction elements of machinery, consisting of 68 to 83% metallic Fe, no more than 2% FeO, 1.0 to 8.0% $SiO_2$, 0.3 to 2.5% MgO, 1.0 to 6.0% CaO, 1.0 to 5.0% $Al_2O_3$, no more than 1% C and 0.1 to 1.0% ZnO and physical characteristics of an apparent specific gravity of 1.25 to 2.06 g/cc, angular specific gravity of 4.0 to 5.5 g/cc, porosity of 50 to 95%, angular grain shape and irregular pore distribution.

4. A reduced ferrite dust material for friction elements of machinery, consisting of 53 to 90% metallic Fe, no more than 2% FeO, 2 to 12% CaO, 1 to 5% $SiO_2$, 1 to 3% MgO, 1 to 3% MnO, no more than 0.5% C, no more than 1% $P_2O_5$, no more than 0.5% S and no more than 0.7% ZnO and physical characteristics of an apparent specific gravity of 1.55 to 2.25 g/cc, a real specific gravity of 5.0 to 6.0 g/cc, porosity of 50 to 75%; angular grain shape and irregular pore distribution.

* * * * *